United States Patent [19]

Orr et al.

[11] Patent Number: 5,191,534

[45] Date of Patent: Mar. 2, 1993

[54] ENGINEERING AND MANUFACTURING CHANGE CONTROL MECHANISM

[75] Inventors: William M. Orr, Cary, N.C.; Badari N. Panuganti, Mableton, Ga.; James L. Ryan, Smyrna, Ga.; George J. Sambataro, Marietta, Ga.; James R. Wason, Tuxedo, N.Y.

[73] Assignee: International Business Machines Corporation, Armonk, N.Y.

[21] Appl. No.: 571,394

[22] Filed: Aug. 21, 1990

[51] Int. Cl.[5] .............................................. G06F 15/46
[52] U.S. Cl. .................................. 364/468; 364/401
[58] Field of Search ............ 364/468, 401, 403, 226.3, 364/226.7, 918.4

[56] References Cited

U.S. PATENT DOCUMENTS

| | | | |
|---|---|---|---|
| 4,459,663 | 7/1984 | Dye | 364/403 |
| 4,866,628 | 9/1989 | Natarajan | 364/468 |
| 4,887,206 | 12/1989 | Natarajan | 364/401 |
| 4,887,207 | 12/1989 | Natarajan | 364/401 |
| 4,887,218 | 12/1989 | Natarajan | 364/468 |
| 4,974,166 | 11/1990 | Maney et al. | 364/478 |
| 4,998,206 | 3/1991 | Jones et al. | 364/468 |

OTHER PUBLICATIONS

"Incremental Engineering Change (IEC) Release", IBM DPRS User Index, vol. 4, Chapter 600, pp. 46-56, Jan. 31, 1989.

"Establish/Modify Change Header—Transaction 2201", IBM DPRS Base System, vol. 4, Chapter 601, pp. 15-19, Jan. 15, 1990.

"Establish/Modify Product Change—Transaction 2206", IBM DPRS Base System, vol. 4, Chapter 601, pp. 52-65, Jun. 15, 1990.

*Primary Examiner*—Jerry Smith
*Assistant Examiner*—Paul Gordon
*Attorney, Agent, or Firm*—John J. Timar

[57] ABSTRACT

A system and method for controlling, monitoring and integrating engineering and manufacturing changes in a manufacturing enterprise. The status of an engineering change and the status of items affected by the engineering change are monitored by an engineering change control manager application running at a central data processing facility. The engineering change and design or modification of items affected by the change are released to one or more manufacturing locations where additional design changes may be made to accommodate local manufacturing capabilities. Each manufacturing location accepts the engineering change and the corresponding affected items when ready to proceed with implementation of the engineering change. The affected items are promoted locally at the manufacturing location to effective status which releases the affected items into production at the plant.

14 Claims, 9 Drawing Sheets

FIG 1

EC AND MEC OBJECTS TABLE

| 22 | 30 | 34 | 36 |
|---|---|---|---|
| EC OBJECT ID | EC OR MEC ID | STATUS OF THE EC | OTHER ATTRIBUTES ... |
|  |  |  |  |
|  |  |  |  |
|  |  |  |  |

AFFECTED ITEMS (AI) TABLE

| 23 | 22 | 26 | 38 | 40 | 42 | 44 | 46 |
|---|---|---|---|---|---|---|---|
| AI OBJECT ID | EC OR MEC OBJECT ID | MASTER ITEM OBJECT ID | AFFECTED ITEM STATUS | ACTION CODE | PLANNED DISPOSITION | PLANNED EFFECTIVITY | DESIGN SEQUENCE NUMBER |
|  |  |  |  |  |  |  |  |
|  |  |  |  |  |  |  |  |

LOCATION AI (LAI) TABLE

| 24 | 28 | 23 | 22 | 26 | 32 | 48 | 50 | 52 | 54 |
|---|---|---|---|---|---|---|---|---|---|
| LAI OBJECT ID | LOCATION OBJECT ID | AFFECTED ITEM OBJECT ID | EC OR MEC OBJECT ID | MASTER ITEM OBJECT ID | REFERENCE CHANGE OBJECT ID | LAI STATUS | PLANNED DISPOSITION | PLANNED EFFECTIVITY | MANUFACTURING SEQUENCE NUMBER |
|  |  |  |  |  |  |  |  |  |  |
|  |  |  |  |  |  |  |  |  |  |

ENGINEERING CHANGES

| EC OID | EC OR MEC ID | STATUS | INITI-ATOR | DESIGN ENGR | REF. NBR |
|---|---|---|---|---|---|
| ECOID1 | EC1 | PRE(REL ACC EFF CLO) | BPANU | WMORR | 100 |

12

MASTER ITEMS

| ITEM OID | ITEM NBR | METAL CODE | REF. NBR |
|---|---|---|---|
| ITMOID 1 | I1 | 10012 | 120 |
| ITMOID 2 | I2 | 23432 | 122 |
| ITMOID 3 | I3 | 65456 | 124 |
| ITMOID 4 | I4 | 11223 | 126 |

20

LOCATION USAGE

| LU OID | LOC OID | ITEM OID | USAGE TYPE | REF.NBR |
|---|---|---|---|---|
| LUSOID 1 | MFG 1 | ITMOID 1 | MFG | 150 |
| LUSOID 2 | MFG 1 | ITMOID 2 | MFG | 151 |
| LUSOID 3 | MFG 1 | ITMOID 3 | MFG | 153 |
| LUSOID 4 | MFG 1 | ITMOID 4 | MFG | 154 |
| LUSOID 5 | MFG 2 | ITMOID 1 | MFG | 155 |
| LUSOID 6 | MFG 2 | ITMOID 2 | MFG | 156 |
| LUSOID 7 | MFG 2 | ITMOID 3 | MFG | 157 |
| LUSOID 8 | MFG 2 | ITMOID 4 | MFG | 158 |

21

BILL OF MATERIAL(BOM) COMPONENTS

| BOM OID | ITEM OID | COMPONENT OID | INSERT SEQ.NBR | REF.NBR |
|---|---|---|---|---|
| BOMOID 1 | ITMOID 1 | ITMOID 2 | 10,000 | 140 |
| BOMOID 2 | ITMOID 1 | ITMOID 3 | 10,000 | 142 |
| BOMOID 3 | ITMOID 1 | ITMOID 4 | 10,000 | 144 |

LEGEND
PRE — PRERELEASE
REL — RELEASE
ACC — ACCEPT
EFF — EFFECTIVE
CLO — CLOSED

AFFECTED ITEMS — 14

| AI OID | EC OID | ITEM OID | STATUS | DESIGN SEQ. NBR | REF. NBR |
|---|---|---|---|---|---|
| AIOID 1 | ECOID1 | ITMOID 1 | PRE(REL ACC EFF CLO) | 10,000 | 130 |
| AIOID 2 | ECOID1 | ITMOID 2 | PRE(REL ACC EFF CLO) | 10,000 | 132 |
| AIOID 3 | ECOID1 | ITMOID 3 | PRE(REL ACC EFF CLO) | 10,000 | 134 |
| AIOID 4 | ECOID1 | ITMOID 4 | PRE(REL ACC EFF CLO) | 10,000 | 136 |

LOCATION AFFECTED ITEMS ("MFG1" VIEW) — 16

| LAI OID | LOC OID | EC OID | ITEM OID | AI OID | STATUS | MFG.SEQ NBR | REF. NBR |
|---|---|---|---|---|---|---|---|
| LAIOID 1 | MFG1 | ECOID1 | ITMOID 1 | AIOID 1 | ACC(EFF,CLO) | 500(300,200) | 161 |
| LAIOID 2 | MFG1 | ECOID1 | ITMOID 2 | AIOID 2 | ACC(EFF,CLO) | 500(300,200) | 163 |
| LAIOID 3 | MFG1 | ECOID1 | ITMOID 3 | AIOID 3 | ACC(EFF,CLO) | 500(300,200) | 165 |
| LAIOID 4 | MFG1 | ECOID1 | ITMOID 4 | AIOID 4 | ACC(EFF,CLO) | 500(300,200) | 167 |

LOCATION AFFECTED ITEMS ("MFG2" VIEW)

| LAI OID | LOC OID | EC OID | ITEM OID | AI OID | STATUS | MFG.SEQ NBR | REF. NBR |
|---|---|---|---|---|---|---|---|
| LAIOID 5 | MFG2 | ECOID1 | ITMOID 1 | AIOID 1 | ACC(EFF,CLO) | 500(300,200) | 162 |
| LAIOID 6 | MFG2 | ECOID1 | ITMOID 2 | AIOID 2 | ACC(EFF,CLO) | 500(300,200) | 164 |
| LAIOID 7 | MFG2 | ECOID1 | ITMOID 3 | AIOID 3 | ACC(EFF,CLO) | 500(300,200) | 166 |
| LAIOID 8 | MFG2 | ECOID1 | ITMOID 4 | AIOID 4 | ACC(EFF,CLO) | 500(300,200) | 168 |

LEGEND
PRE — PRERELEASE
REL — RELEASE
ACC — ACCEPT
EFF — EFFECTIVE
CLO — CLOSED

FIG 8B

ENGINEERING AND MANUFACTURING CHANGE CONTROL MECHANISM

BACKGROUND OF THE INVENTION

The present invention relates, in general, to computer integrated manufacturing (CIM) systems and, in particular, to a method and system for controlling, monitoring and integrating engineering and manufacturing changes in a manufacturing enterprise.

In a typical manufacturing enterprise, a design engineer in a laboratory creates a design change document whenever changes to a product, or any of its components, is necessary. Changes to a design may include item data changes, bill-of-material changes, or reference document changes. When the changes are completed, the design change document along with the actual changes in items and bills-of-material is sent to each manufacturing location that uses the item as either an end product or component of an end product. At a manufacturing location, a manufacturing engineer responsible for the item at the specific plant analyzes the design changes and, if appropriate, makes modifications to the design changes to accommodate the manufacturing process at the plant. These changes are passed on to the shop floor for actual production.

Although computer-aided systems are widely used in most, if not all, functional areas within a manufacturing enterprise, the traditional approach has been to use several data bases providing limited capabilities to isolated functional areas. Along with the different data bases, it is common for each functional area to use different methods of entering information and tracking changes. In particular, engineering and manufacturing have heretofore not been integrated for information sharing. Thus, manual intervention has been required to transfer technical information between the engineering and manufacturing functions.

There is a need for an integrated manufacturing system that provides enough functionality to both the design and manufacturing engineers so that all tasks involved in propagating the released design and manufacturing changes into actual production are executed efficiently. This requires that the "as built" product be tracked adequately since the "as built" product can be different at each of the manufacturing locations due to differences in local manufacturing capabilities. There is also a need for an integrated manufacturing system that enables monitoring of a given design change at the design center and/or the manufacturing locations, thereby allowing effective control of the interface between centralized design departments and localized manufacturing departments.

SUMMARY OF THE INVENTION

It is an object of this invention to provide an engineering and manufacturing information system to control, monitor and integrate engineering and manufacturing changes, thus serving to coordinate the "as built" product from multiple manufacturing lines with the "as designed" product from the design center.

It is another object of this invention to provide a unique centralized control mechanism for channelling all design changes in order to provide up-to-date information on the status of all design changes.

It is a further object of this invention to provide a method for controlling and monitoring the progress of design changes from inception at a design center through implementation at manufacturing locations.

These and other objects and advantages are accomplished by the present invention in which an object oriented approach is used to establish many-to-many relationships between engineering changes and items in the master item database. When a design engineering change (EC) needs to be made in an enterprise, the design engineer creates an "EC" object that contains the attributes and functions of a change control mechanism. Every "EC" object is given a unique identifier called an object id which all design changes relating to the engineering change will carry in order to facilitate tracking back to this "EC" object. The "EC" object contains administrative information about an engineering change, such as the designer making the change and the reasons for the change. Similarly, when a manufacturing engineer wants to make changes to the design for his location or wants to create a new item to implement some changes at his location, he creates an "EC" object called a "MEC" for manufacturing engineering change.

When the design engineer needs to change or create an item which is encapsulated as an object called "Master Item", he defines data describing the relationship between the item and the EC. This is referred to as an object called "Affected Item (AI)" which is identified by the pair of external identifiers, i.e., item number and EC number. The "Affected Item (AI)" object contains control information like intended action or planned effectivity. The data in this object can be viewed as the engineering control data of an affected item. Since each master item may have many levels of design engineering changes, and each engineering change may affect many master items, the "AI" object represents a many-to-many relationship between the two. An "AI" object is uniquely represented by the combination of EC object ID and master item object ID.

After adding an affected item, the design engineer makes the necessary design changes in the item data, BOM data, and drawing data and decides that the changes should be implemented. This begins the status progression of design changes from drawing board concept to production shop floor implementation. The progression is from pre-release to release at the design lab, followed by acceptance, making the design changes effective and eventually closing the design changes at manufacturing plants.

When an affected item object is added to a design change, it is created in a status of PRE-RELEASE. As the design engineer completes the design of the affected item, he releases the item to all locations manufacturing the item. At release, the status of the affected item is changed to RELEASE. Every location that manufactures the item is informed there is a new release for that item. This notification alerts the manufacturing engineer to analyze the incoming release for possible modification for local production.

The manufacturing engineer at each location initiates processing of the engineering change by promoting the status of the affected items to ACCEPT status. The system copies the affected item object received at the location into another object called "Location Affected Item (LAI)", which is location sensitive. The data in this object can be viewed as the manufacturing control data of an affected item at a specific location. Each location can make changes to the manufacturing location data that is visible locally. The changes made at a given location are only applicable to that plant's view of the data. The design laboratory and the other manufacturing plants are isolated from these changes. The status of the location affected item is initiated as ACCEPT. The manufacturing engineer changes the administrative data provided in the LAI object to tailor it to the needs of the specific plant. For example, planned disposition of an item or planned effectivity data might be altered. He also enters manufacturing data such as yield of the item, specific routings, and procurement data.

When the necessary manufacturing data is available, the manufacturing engineer at the plant promotes each of these location affected items to EFFECTIVE status making them visible to material requirements planning, production scheduling, inventory, work in process and other applications. In a general sense, the manufacturing engineer is releasing the items into production at that plant. The status of an affected item is changed to CLOSED when the manufacturing engineer decides no further changes to an affected item will be allowed at the plant.

The status of the engineering change and the status of an affected item are updated automatically as necessary whenever a change occurs to the status of a location affected item at any of the manufacturing plants using the affected item. This enables the status of an affected item to be kept at the least advanced status of the item at any plant. Similarly, the status of an engineering change is kept at the least advanced status of any of the affected items pertaining to an engineering change at any plant.

The foregoing features and advantages of the invention will be more fully described below in conjunction with the accompanying drawings.

DETAILED DESCRIPTION OF THE PREFERRED EMBODIMENT

Figure 1:
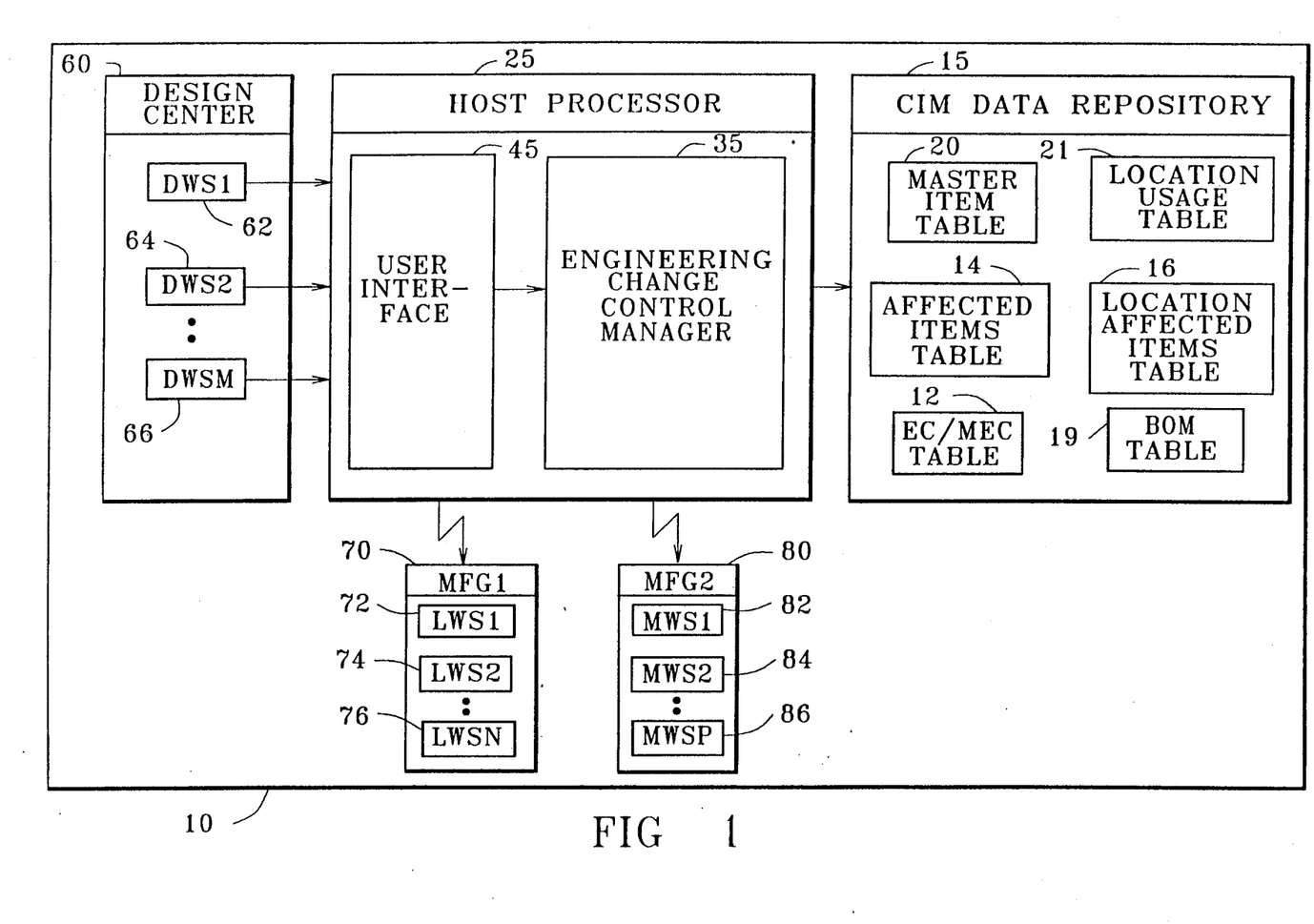
FIG. 1 illustrates a block diagram implementation of the Engineering Change Control Manager system of this invention.

An implementation of the Engineering Change Control Manager system 10 is illustrated in FIG. 1. The implementation shows a host processor or central data processing system 25, having a single design center 60 and two separate manufacturing facilities 70, 80. One skilled in the art of computer-based manufacturing information systems will be able to apply the concepts discussed herein readily to both centralized and distributed processing architectures.

Running on host processor 25 is the Engineering Change Control Manager 35. The users at the design or manufacturing locations interact with the Engineering Change Control Manager 35 through the user interface 45. The host processor 25 accesses the direct access storage device (DASD) 15 which contains the CIM data repository including master item table 20, EC/MEC table 12, Affected Items (AI) table 14, Location Affected Items (LAI) table 16, Bill of Material table 19, and Location Usage table 21.

Design center 60 contains a plurality of individual workstations DWS1, DWS2, ... DWSM identified by reference numerals 62, 64, 66. These workstations enable design engineers responsible for an engineering change to interact with the Engineering Change Control Manager application 35. Similarly, at manufacturing location MFG1, identified by reference numeral 70, manufacturing engineers use workstations LWS1, LWS2, ... LWSN, identified by reference numerals 72, 74, 76 to interact with Engineering Change Control Manager 35. A second manufacturing location MFG2 identified by reference numeral 80 is also shown in FIG. 1. Workstations MWS1, MWS2, ... MWSP (reference numerals 82, 84, 86) are used by the manufacturing engineers at this location.

Figure 2:
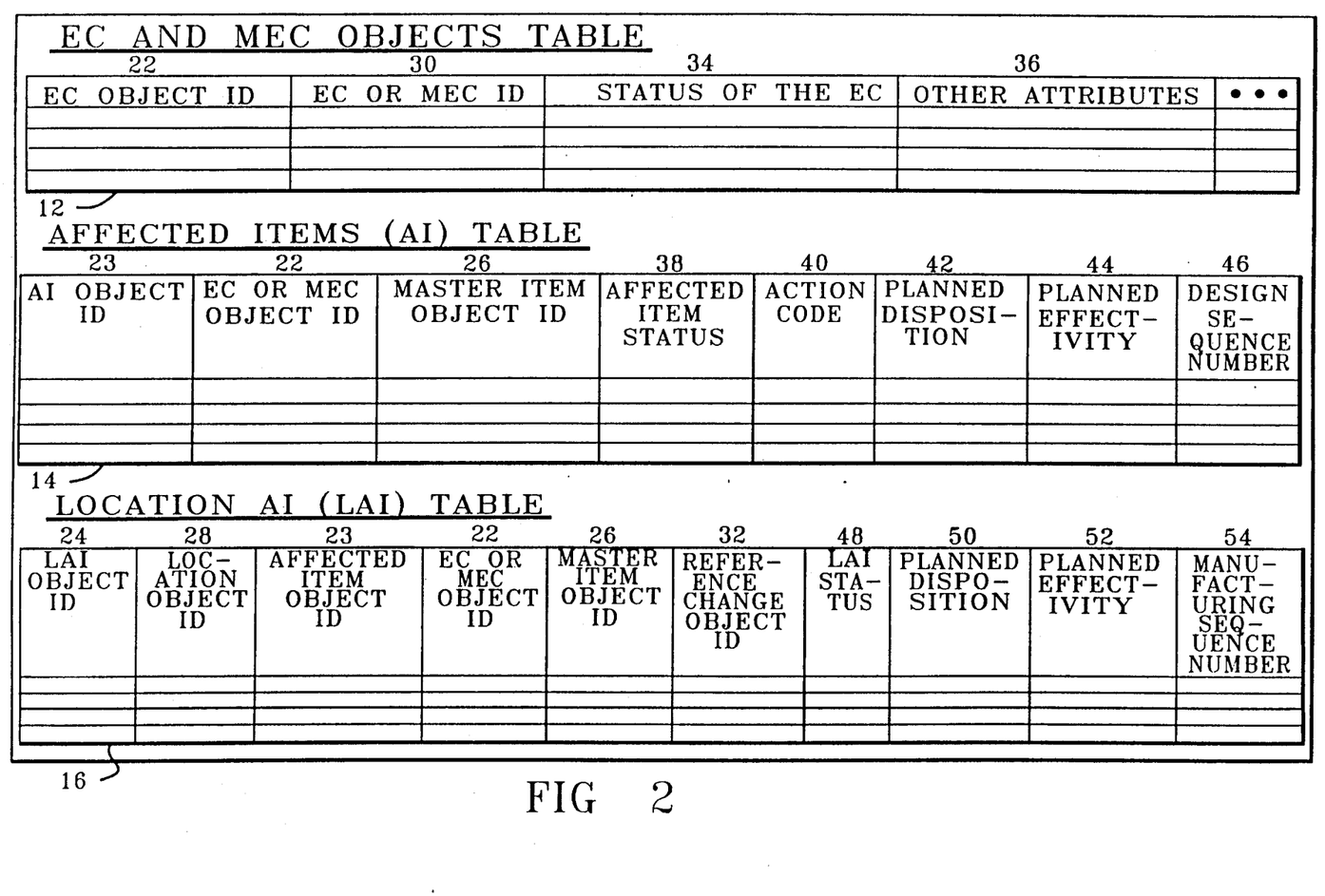
FIG. 2 illustrates the EC/MEC objects table, Affected Items table and Location Affected Items table generated by the Engineering Change Control Manager.

Detailed compositions of EC/MEC objects table 12, Affected Items (AI) table 14, and Location Affected Items (LAI) table 16 are shown in FIG. 2. These tables are created and updated by Engineering Change Control Manager 35. All three tables are stored in the CIM data repository on DASD 15. EC/MEC objects table 12 relates a set of design changes to each object created by a design engineer or manufacturing engineer. The EC/MEC objects table 12 contains all the ECs or MECs created in a given enterprise. Each row in the table represents an EC or MEC and the columns represent attributes of the object instance (occurrence). The first column contains the EC object ID 22 which is a unique internal identifier for each instance of the object across the whole enterprise. Every object in the enterprise has this attribute which is an internal attribute used for tracking. The next column contains the EC or MEC ID 30 and represents the external enterprise identification for each engineering change created in the enterprise. Any changes made to a design reflect this identification so that changes may be tracked to a specific engineering change. The status of the EC column 34 contains the EC status which is the progression of the change towards release and its implementation in the manufacturing plants. Other attributes column 36 contains administrative attributes of an EC such as dates or responsible persons.

Affected Items (AI) table 14 contains the objects to which all design changes are related. An affected item object is created whenever an EC or MEC affects an item. Each row is created with a combination of EC (MEC) object ID and master item object ID. The Master Item table is a separate part of the physical database 15 containing all the parts of an enterprise. The AI table 14 represents a many-to-many relationship between instances of the EC/MEC table 12 and instances of Master Item table 20. The combination of EC/MEC object ID 22 and Master Item object ID 26 uniquely represents an affected item. The data in the AI table 14 is viewed as the control data for an affected item.

The first column contains the AI object ID 23 which is the unique internal identifier for each occurrence of the object. The second column contains the EC (MEC) object ID 22 which is the unique identifier for the EC or MEC related to an item. An affected item has no direct external identification. Instead, it is identified by the combination of EC object ID and master item object ID. The master item object ID column 26 contains the unique identifier for the master item affected by the EC/MEC. The affected item status column 38 indicates how far the affected item has progressed towards closure. The different states are described subsequently. Action code column 40 indicates the reason a master item is being affected by an engineering change. Typical reasons include new part introduction, changing an existing part, or issuing to a new location. The planned disposition column 42 indicates the action to be taken on existing stocks of a part in the various plants as a result of introducing a new change. Typical dispositions are scrap or rework. The planned effectivity column 44 indicates when a change introduced through an affected item should be made effective, which actually introduces the item into production. Design sequence number column 46 indicates the sequence in which changes are introduced on a master item by different ECs. This number either indicates the sequence in which different versions of a particular master item were created by different ECs/MECs, or the sequence in which the engineering changes were released.

The Location Affected Item (LAI) table 16 contains information pertaining to an affected item that is location dependent. An instance of location specific data is created and stored in LAI table 16 whenever an EC affected item is accepted at a manufacturing location after release by the design engineer or a MEC has an affected item added to it. The unique identification for data in the table is provided by a combination of location object ID 28, EC object ID 22, and master item object ID 26. The data in LAI table 16 represents the manufacturing view of an affected item at a specific manufacturing plant. Each plant can manipulate the manufacturing data contained in LAI table 16 without changing the control data in AI table 14. Only the changes made at a specific plant are reflected in that location's view of the affected item data. Both the design lab and other manufacturing plants are isolated from these local changes.

The LAI object ID column 24 is the first column in the LAI table 16 and provides a unique identifier for each row of this table across the entire database. Location object ID 28 is the unique identifier for a specific manufacturing location. Any changes made to an affected item at a location are stored using this identifier. The affected item object ID 23 is the unique internal identifier of an affected item in AI table 14 represented by this row. The location affected item is identified by a combination of location object ID 28 and affected item object ID 23. EC or MEC object ID 22 is the unique internal identifier for the EC or MEC that corresponds to the location affected item. The master item object ID 26 is the unique internal identifier for the master item that is affected by the EC/MEC. Reference change object ID 32 is an internal identifier that correlates an EC change level with the corresponding effective MEC.

The location affected item status column 48 indicates the status of the location affected item at any time at a specific plant. Planned disposition column 50 indicates the action to be taken on existing stocks of the affected part in the manufacturing plants as a result of introducing the engineering change. When a design change is released to a plant, the planned disposition is the one suggested by the design department. However, each local plant can change this disposition as appropriate. The planned effectivity column 52 indicates when the change being introduced through the affected item is to be made effective, i.e., introduced into production. Manufacturing sequence number column 54 indicates the sequence in which changes are being introduced on a master item by different ECs at a specific location. The manufacturing sequence number identifies either the sequence in which different versions of a particular master item as created by different ECs/MECs were accepted by the location, or the sequence in which these changes were made effective at the location.

The status of an affected item, whether residing at a design laboratory or at a manufacturing plant, keeps changing as the set of design changes attached to that affected item gets promoted to the next status in progression. The progression varies for affected items at a manufacturing plant when compared to affected items at the design laboratory.

The status of an affected item at the design laboratory is a global variable and is independent of the location (design lab or manufacturing plant) making the query. The possible states for the affected item are PRE-RELEASE, RELEASE, ACCEPT, EFFECTIVE, and CLOSED. When an engineering change is initiated, an affected item is created in PRE-RELEASE state. The status of the affected item is changed to RELEASE when the set of design changes attached to an EC is released to at least one manufacturing plant. The status of the affected item is promoted from RELEASE to ACCEPT when all manufacturing plants having a use for the item have accepted this affected item. The next status change for the affected item occurs when all plants that have use for the item make that item EFFECTIVE. When that occurs, the global status of the affected item is also changed to EFFECTIVE. Finally, when all plants that have use for the item close the affected item, the global status of the affected item is also changed to CLOSED.

The possible status progression of affected items at a manufacturing plant is ACCEPT, EFFECTIVE and CLOSED. Since the status of an affected item at a plant is location specific, the affected item is referred to as a location affected item. When a manufacturing plant having use for the item accepts it locally, the status of the location affected item (LAI) is initiated as ACCEPT. The status is changed to EFFECTIVE when the location affected item is promoted to effective (i.e., released into production) at the plant. The status is changed to CLOSED when the plant closes the location affected item, thereby preventing further changes.

Figure 3:
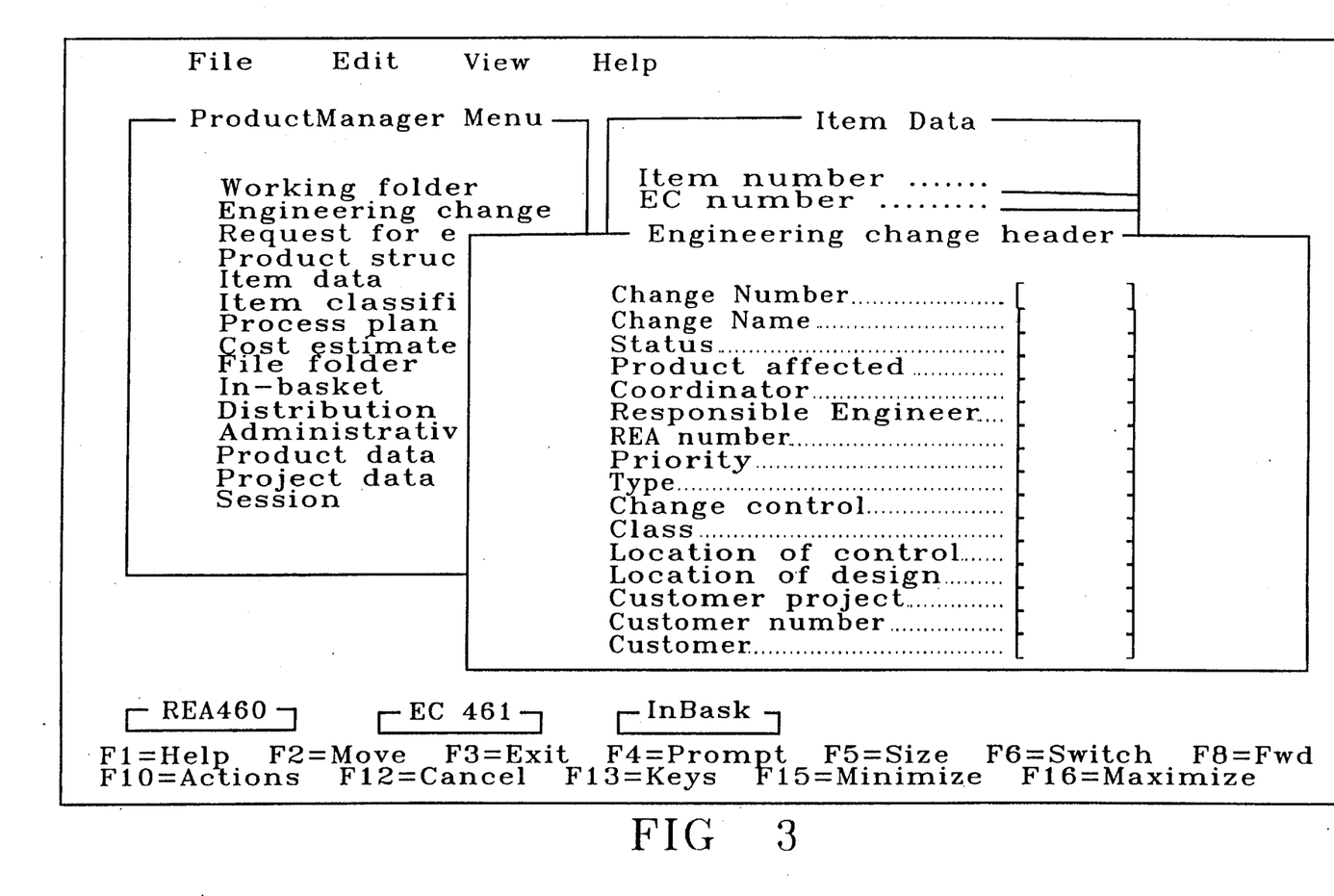
FIG. 3 illustrates a user interface screen display for interacting with the Engineering Change Control Manager.

A screen window display provided to the user by user interface 45 is illustrated in FIG. 3. As shown in the figure, the engineering change initiator uses this window to enter administrative information regarding the engineering change and to initialize the status of the engineering change. The design engineer uses this window to promote the status of an engineering change to RELEASE. Similar windows are provided by user interface 45 to enable the design engineer and manufacturing engineer to promote the status of affected items and location affected items, respectively.

Figure 4:
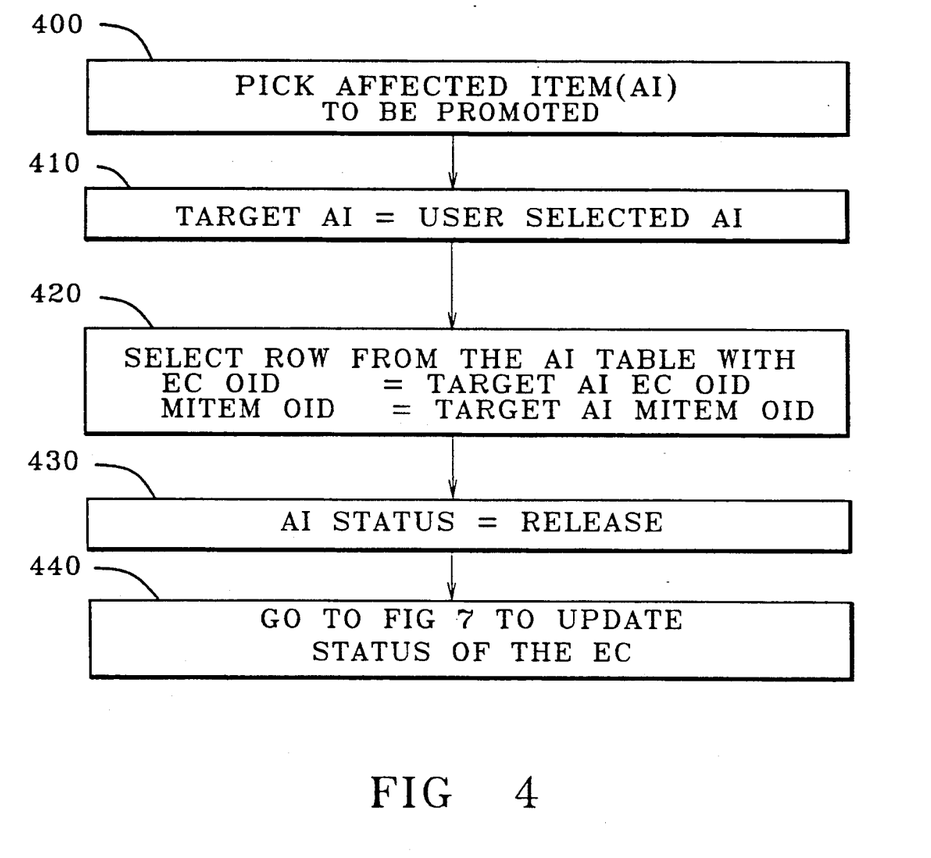
FIG. 4 illustrates the processing logic used in promoting an affected item from PRE-RELEASE to RELEASE status.

FIG. 4 illustrates a flow chart for the processing logic used by the Engineering Change Control Manager 35 in promoting an affected item's status from PRE-RELEASE to RELEASE. The processing logic is activated when the system user selects an affected item and executes an action to promote it to RELEASE status. In logic block 400, the user selects (inputs) an affected item for promotion to RELEASE. The affected item is assigned to a local variable called target AI in logic block 410. The input affected item is identified by a combination of EC object ID and master item object ID. In logic block 420, the row corresponding to the input affected item is selected from the AI table 14 based on the EC object ID 22 and master item object ID 26. The affected item status 38 is changed to RELEASE in logic block 430. At this point in time, the location affected item does not exist. Logic block 440 provides for the update of the EC status 34 in EC/MEC objects table 12 if it needs to be changed. The global EC status is advanced to the next status when the last of its corresponding affected items is promoted to the next status. In an alternate embodiment of this invention, the global EC status is advanced to the next status, before any of the corresponding affected items can be promoted to the next status.

Figure 5:
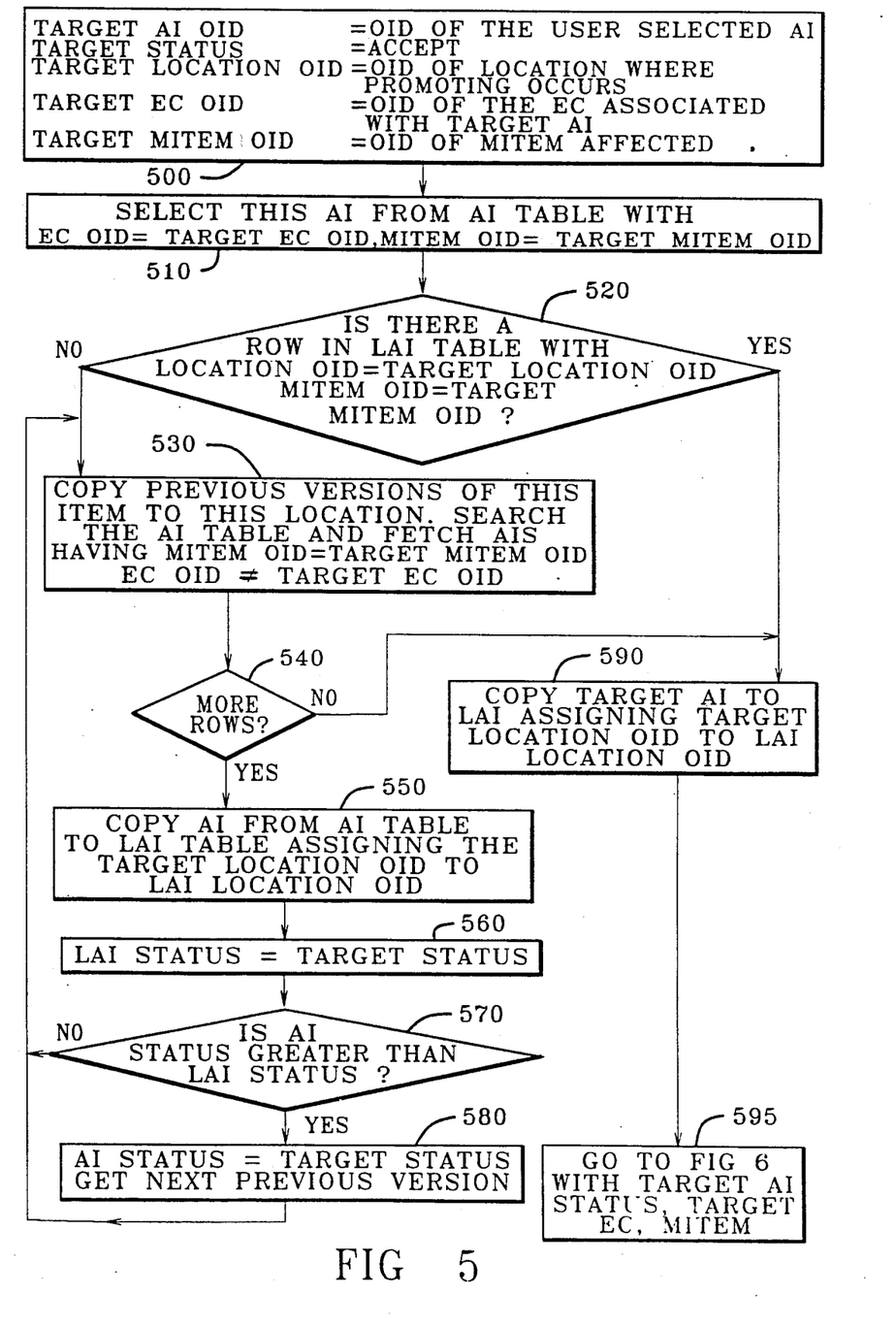
FIG. 5 illustrates the processing logic for promoting an affected item to ACCEPT status.

The flow chart in FIG. 5 illustrates the processing logic for promoting an affected item to ACCEPT status at a manufacturing plant. The processing logic in the Engineering Change Control Manager 35 is activated when a user selects an affected item and executes an action to promote it to ACCEPT status. In logic block 500, the user selected affected item, status, location, EC object ID and master item object ID are assigned to local variables. Since promoting beyond RELEASE status is done on a per location basis, the user has to specify the location where the promotion needs to be done. The user selected affected item is fetched from AI table 14 in logic block 510. Decision block 520 tests if the location has all prior versions (changes) of an item. A location needs to have all prior versions of an item before it can accept a new change. If the location does not have any previous versions, all the previous affected items need to be copied before copying the new version in logic block 530. Otherwise, only the new version needs to be copied in logic block 590.

In logic block 530, previous versions of the item are copied to Location Affected Items table 16 for this location. The previous versions are found by searching the AI table 14 on the master item object ID 26. This retrieves all versions of the same master item with all engineering changes on it. Since the new release is not to be copied as yet, this EC's version is not selected. In decision block 540, a test is made to determine if there are any more versions of the master item in AI table 14. If all previous versions have been copied, the target version is copied from AI table 14 to LAI table 16 as indicated in logic block 590. Otherwise, the previous version of the affected item is copied from the AI table 14 to the LAI table 16. The location object ID 28 is appended to the logical key combination of EC object ID 22 and master item object ID 26 to uniquely identify this row in the LAI table 16.

Next, logic block 560 changes the status of the location affected item in LAI table 16 to ACCEPT status. In decision block 570, a test is made to determine if the status of the affected item 38 in AI table 14 is greater than the status of the location affected item 48 in LAI table 16. Since previous versions of the affected item have been implicitly promoted to ACCEPT status, the status of the target or present version of the affected item must be changed to ACCEPT if its previous version status was greater than ACCEPT. Otherwise, the affected item status 38 is ACCEPT or RELEASE. If it is RELEASE, there is at least one location that has not accepted the affected item. In either case, no further adjustments to the affected item status 38 are necessary. The next previous version is retrieved by looping back to logic block 530. In logic block 580, since the affected item status 38 of the previous version was greater than ACCEPT, its status has to be reduced in AI table 14 to ACCEPT. Therefore, the target status is assigned to the affected item status 38 and then a loop back to logic block 530 occurs to get the next previous version.

Logic block 590 results in the copying of the target or current version to the LAI table 16 after all previous versions have been copied. The status of the location affected item 48 needs to be changed to ACCEPT. Since the affected item status changes when the last of the locations using it promotes it to the next status, a check must be made after an LAI is promoted to determine if the status of the affected item needs to be changed. Control passes to the flow chart depicted in FIG. 6 passing the target affected item, its status, EC object ID and master item object ID (logic block 595).

Figure 6:
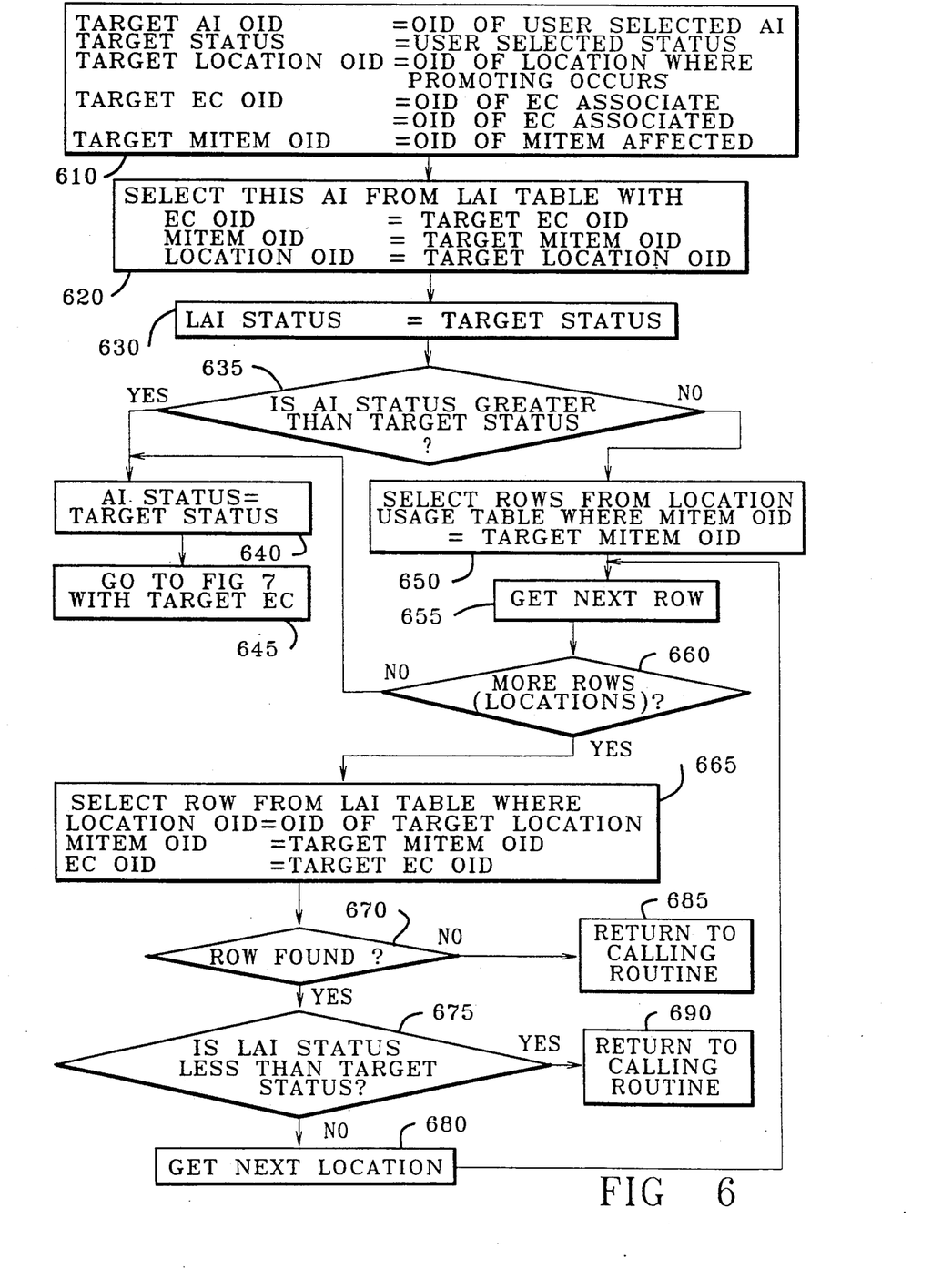
FIG. 6 illustrates the processing logic for updating the global status of an affected item in the Affected Items table.

The logic flow chart illustrated in FIG. 6 is used by Engineering Change Control Manager 35 for promoting an affected item from ACCEPT to EFFECTIVE and from EFFECTIVE to CLOSED, and for updating the global status of the affected item object 14. The processing logic is activated when the user selects an affected item and executes an action to promote it to EFFECTIVE or CLOSED, or when control is passed from block 595 of FIG. 5. In each situation the processing logic is the same.

In logic block 610, the user selected affected item, the location where the promotion is occurring, the EC object ID to which the affected item belongs and the master item affected by the engineering change are assigned to local target parameters. The affected item is selected from the LAI table 16 using the unique key provided by location object ID 28, EC object ID 22 and master item object ID 26 (logic block 620). Since the location affected item is being promoted, its status 48 is changed to the target status in logic block 630.

Since the status of a location affected item has changed in LAI table 16, decision block 635 tests if the global status of the affected item needs to be changed in AI table 14. This is accomplished by determining if the AI status 38 is greater than the LAI status 48 (which is the same as the target status). If this is the case, AI status 38 is reduced to the current LAI status 48 for the affected item in logic block 640. Whenever the status of an affected item is changed, Engineering Change Control Manager determines if the EC status itself needs to be changed. An engineering change comprises a plurality of affected items. Thus, logic block 645 indicates a transition to FIG. 7 for additional processing using the target EC object ID as a parameter.

If in decision block 635, the AI status 38 is found to be less than the current LAI status 48, a further test must be made to determine that the LAI status 48 for this affected item is at least the same at all the manufacturing plants. Thus, in logic block 650, all locations using the affected item are retrieved from the Location Usage table 21 by searching on the target master item object ID. The next location to be tested is obtained from Location Usage table 21 in logic block 655, and testing for further locations is made in decision block 660. If all locations using the affected item have been tested, none of them had the corresponding location affected item at LAI status 48 less than the target status (i.e., the location affected item status for the current manufacturing plant being examined). Thus the global status 38 of the affected item in AI table 14 needs to be changed. This is done by the processing in logic block 640 followed in logic block 645 by transferring to the processing logic of FIG. 7.

In logic block 665, the next location using the affected item is selected from LAI table 16 by searching on the location object ID 28, master item object ID 26 and EC object ID 22. If a corresponding row in the LAI table 16 is not found in decision block 670, it indicates that no other location has accepted the affected item. Therefore, the global status of the affected item remains RELEASE and no change is to be made to either the global status 38 of the affected item in AI table 14 or to the status of the EC 34 in EC/MEC objects table 12. The procedure is simply exited in logic block 685.

If a row is found in decision block 670, it means a LAI was found; therefore, a test on the status 48 of the LAI is made in decision block 675. If the LAI status 48 is found to be less than the target status, no change is to be made to the global status 38 of the affected item or to the status of the EC 34. The procedure is exited in logic block 690. If in decision block 675 the LAI status 48 is equal to or greater than the target status, the processing logic causes a loop back from logic block 680 to logic block 655 to get the next location to process. The global status 38 of the affected item needs to be updated (in logic block 640) if none of the locations had an LAI status 48 less than the target status.

Figure 7:
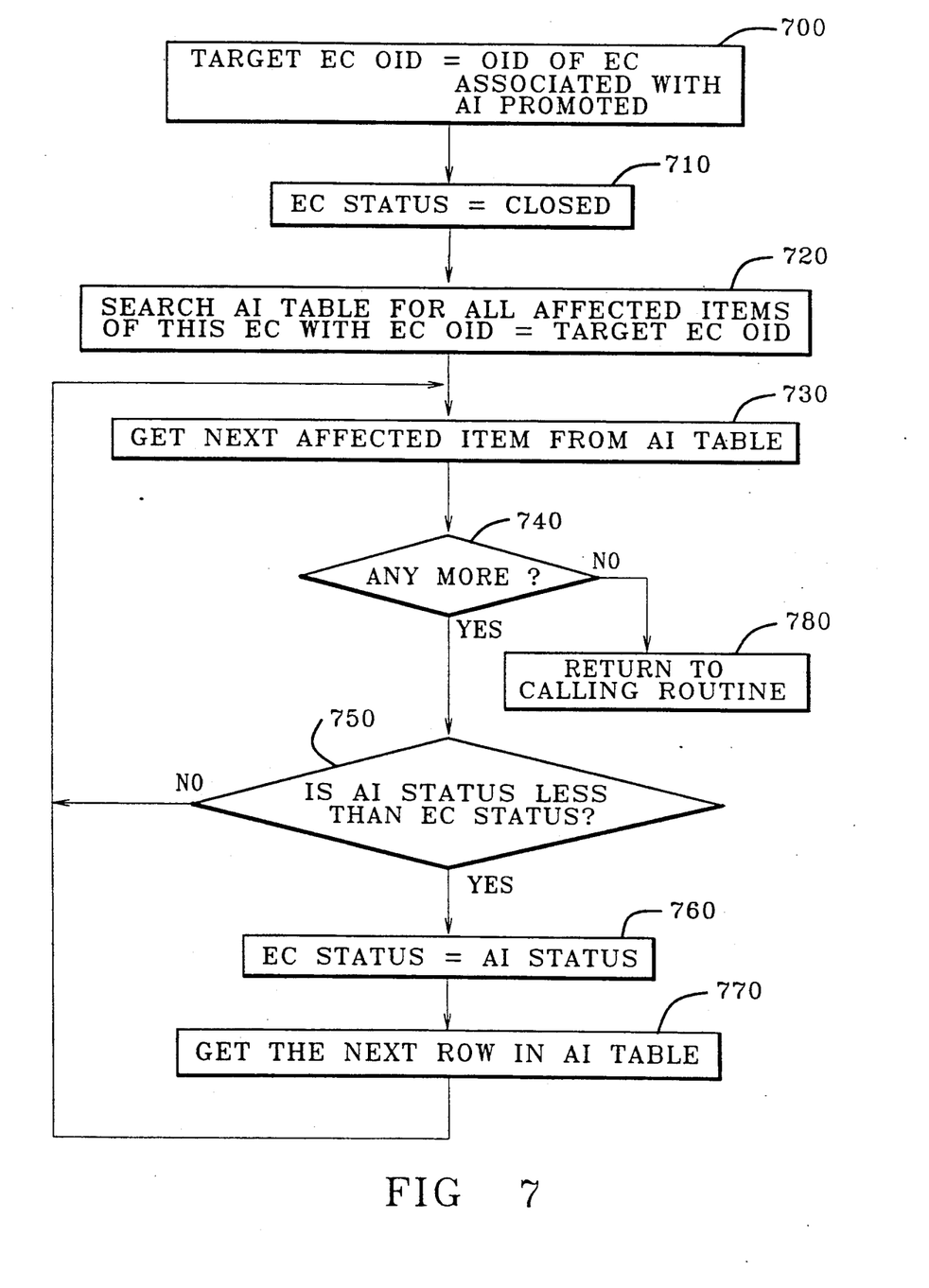
FIG. 7 illustrates the processing logic for updating the global status of an engineering change in the EC/MEC table.

FIG. 7 illustrates the processing logic used by Engineering Change Control Manager 35 for updating the global status 34 of an EC in EC/MEC table 12. The procedure is called whenever the global status 38 of an affected item has changed to determine if the EC status 34 also needs to be changed. Control switches to the logic in this figure from either logic block 440 in FIG. 4 or logic block 645 in FIG. 6.

In logic block 700, the target EC identifier is assigned the EC object ID 22 of the input EC whose affected item was originally selected by the user for promotion. The EC object is retrieved from the EC table 12 and its status 34 is changed to CLOSED. This processing logic is indicated by logic block 710. The EC status is set to the highest possible status initially (i.e., CLOSED) and then reset to the lowest status of any of its affected items. To this end, the AI table 14 is searched (logic block 720) for all affected items of the EC. Thus the AI table 14 is searched using the target EC object ID to find all affected items in the table related to this EC. The next affected item is then retrieved in logic block 730. Decision block 740 tests to determine if there are any more affected items associated with the EC. If all affected items of the EC have been exhausted, the procedure is exited in logic block 780. If another affected item is found in decision block 740, its status is checked in decision block 750 wherein a test is made to determine if the status 38 of the affected item is less than the status 34 of the EC. If the AI status 38 is greater than or equal to the EC status 34, the status of the EC remains unchanged and the next affected item of the EC is examined by looping back to logic block 730. On the other hand, if the AI status 38 is less than EC status 34, the status of the EC must be changed to that of this affected item. This processing is performed in logic block 760. At this point, logic block 770 causes a return to logic block 730 to retrieve the next affected item associated with the EC and repeat the comparison processing. When all affected items have been examined, control passes to logic block 780 which results in exiting the procedure.

Figure 8A:
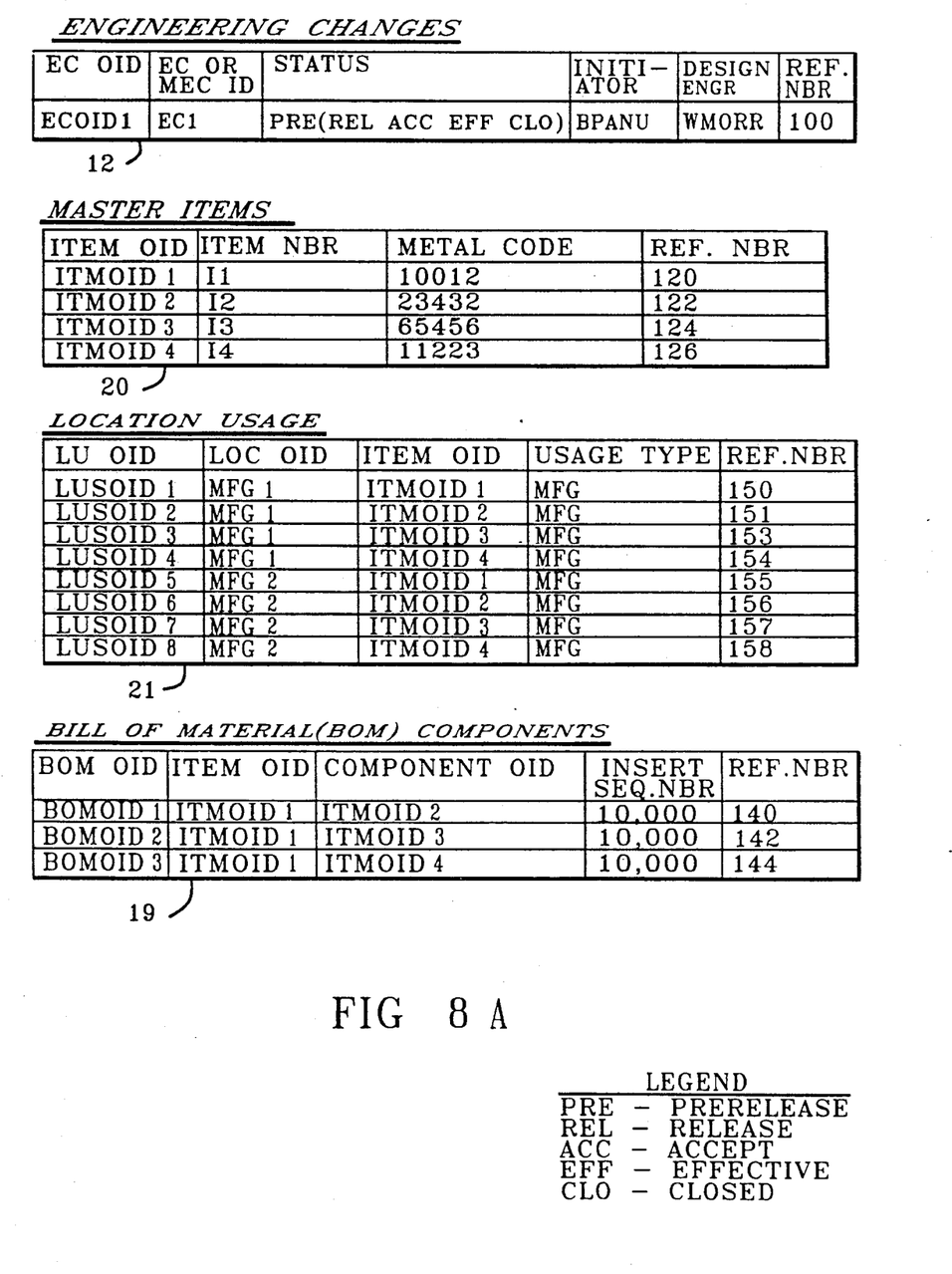
FIGS. 8A-B depict database entries illustrating the operation of the present invention.
Figure 8B:
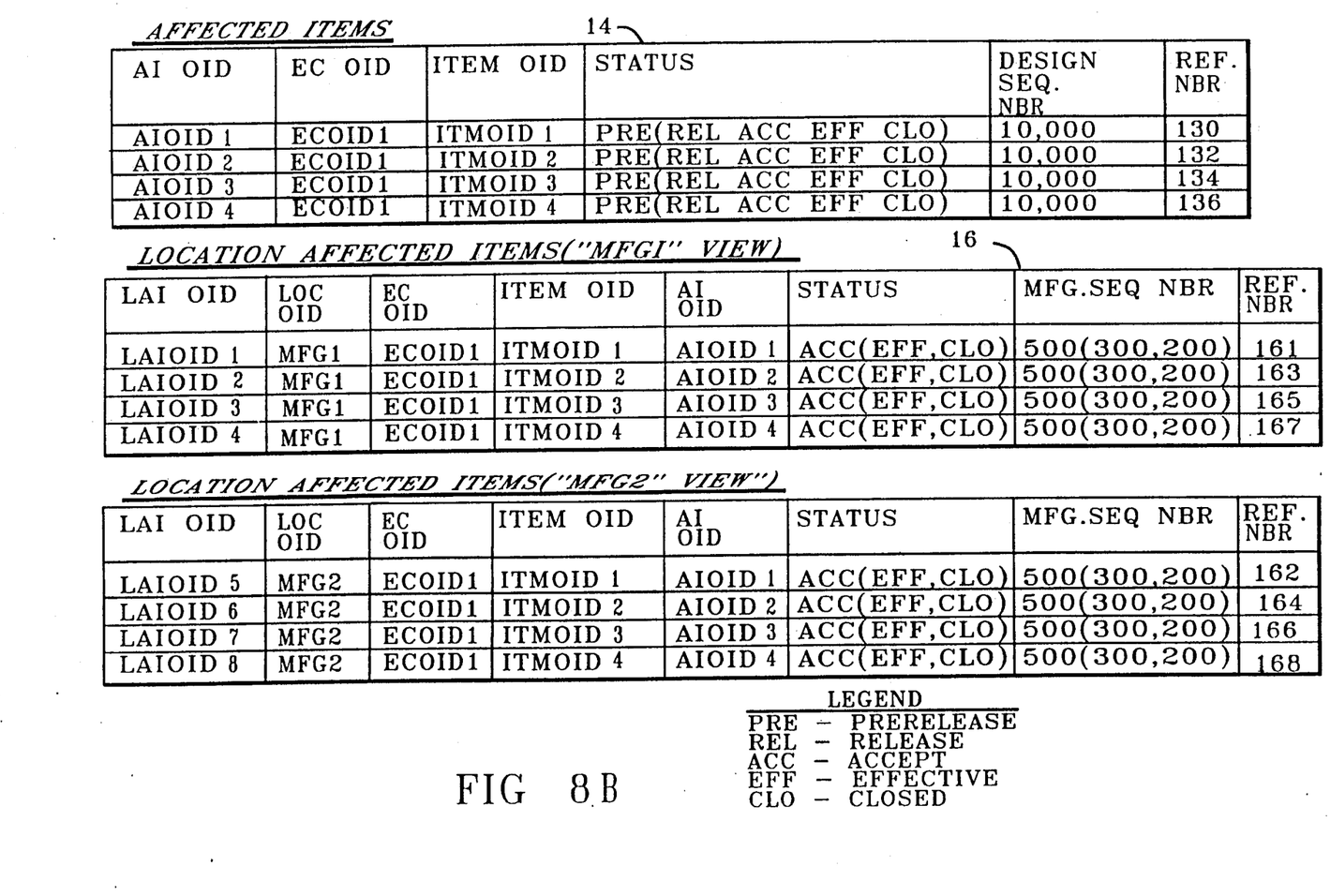

An example illustrating the operation of the engineering and manufacturing change control mechanism is provided in FIGS. 8A-B. A company decides to manufacture a new turbine having part number I1, which is to be assembled from components I2, I3 and I4. These parts are designed and added to the turbine's bill of material. The turbine design is released to two manufacturing locations (MFG1 and MFG2) where the manufacturing engineer accepts the design, makes necessary changes and makes the design EFFECTIVE in the manufacturing plant.

Engineering change coordinator BPANU initiates an engineering change labeled with external identifier EC1 and assigned to design engineer WMORR, by entering the change into the EC objects table 12 in the database as indicated by reference numeral 100. This engineering change is identified by EC object ID ECOID1. EC1 is created in a status of PRE-RELEASE. The design engineer adds an affected item to Affected Items (AI) table 14 by entering data pertaining to item number I1. The Engineering Change Control Manager 35 searches the Master Item table 20 and determines that the turbine is a new item. Engineering Change Control Manager 35 adds item I1 to Master Item table 20 indicated by reference numeral 120. Engineering Change Control Manager 35 then adds a new affected item 130 to AI table 14. The status of the Affected Item is PRE-RELEASE. A design sequence number is provided to the affected item, in this example starting with 10,000. This number is incremented automatically upon further engineering changes to this item.

The design engineer next invokes the Engineering Change Control Manager 35 to add to the AI table 14 items I2, I3 and I4, which are the assembly components of the turbine, item I1. The Engineering Change Control Manager 35 determines that I2, I3 and I4 are new items and adds them to Master Item table 20, as indicated by reference numerals 122, 124 and 126. These items are then added to AI table 14 as indicated by 132, 134 and 136 with the status of each being PRE-RELEASE.

The design engineer proceeds to create a bill of material for assembly I1 including its components I2, I3 and I4. The Engineering Change Control Manager adds the bill of material components to Bill of Material Table 19 as indicated by 140, 142 and 144. The insert sequence number column indicates the engineering change that added a particular component by using the design sequence number of the corresponding affected items in AI table 14.

From the information thus far entered into CIM database 10, the initiator of a design change that added component I2 to assembly I1 can be determined by noting the insert sequence number for item I1 and searching AI table 14 for all items having a matching design sequence number. The Engineering Change Control Manager 35 retrieves all matching items and the person making the query can examine the EC number column for identification of the engineering change.

He then proceeds to the EC table 12 to retrieve the EC1 record which will identify the initiator of the design change.

After finishing all design changes, the design engineer decides which manufacturing locations are to receive the changes for implementation before he can release the engineering change. He uses Engineering Change Control Manager 35 to add location usage for items I1, I2, I3 and I4. Each item is picked up individually and each location using the item is specified. The Engineering Change Control Manager 35 adds this data to Location Usage table 21. These additions are indicated by reference numerals 150-157.

The design engineer, once satisfied with his design and after obtaining necessary approvals, uses the Engineering Change Control Manager 35 to release the engineering change to the appropriate manufacturing locations. The Engineering Change Control Manager selects EC1 and the affected items I1 through I4 and verifies each affected item and its corresponding bill of material data. If the verifications are satisfactory, the Engineering Change Control Manager 35 releases the engineering change. This process includes the following steps:

1. The status of affected items 130, 132, 134 and 136 in AI table 14 is change to RELEASE.
2. From Location Usage Table 21, the manufacturing locations which use each of the items affected by the engineering change are determined. For example, affected item AIOID1, identified by reference numeral 130 in AI table 14, has item number I1 associated with it, and item I1 is associated with plants MFG1 and MFG2 in Location Usage Table 21 as identified by reference numerals 150 and 154. This step is repeated for affected items AIOID2, AIOID3 and AIOID4 (reference numerals 132, 134, 136 respectively).
3. A message is sent to each location to inform the location of the release of each affected item.
4. The status of the engineering change identified in EC table 12 as ECOID1 is changed to RELEASE which is the minimum status of any of the corresponding affected items at this point.

At location MFG1, the manufacturing engineer receives a notification that items I1, I2, I3 and I4 have been released to his location using engineering change number EC1. He examines EC1 and all the design changes it is carrying, and makes the decision to start manufacturing assembly I1 at plant MFG1. When the manufacturing engineer interacts with the system to accept the design changes carried by EC1, the Engineering Change Control Manager 35 performs the following steps:

1. It selects EC1 and checks that it is in a status that can be accepted at a manufacturing location.
2. It selects the first affected item, AIOID1, that is associated with item I1.
3. The Location Usage Table 21 is searched for an entry having item object identifier ITMOID1 and location object identification MFG1. It retrieves the record identified by reference numeral 150.
4. A location affected item 161 is created at location MFG1 for item I1 and engineering change EC1 and placed in LAI table 16 with object identifier LAIOID1. The status of the LAI created is ACCEPT.
5. With the change in status of LAIOID1 to ACCEPT, the logic of FIGS. 6 and 7 is executed, in turn, to determine if the status of the corresponding affected item AIOID1 and the status of engineering change ECOID1 needs to be updated.

A search is performed on the entries in LAI table 16 for a location affected item at location MFG2 having item object identifier ITMOID1. Since location MFG2 has not yet accepted item I1, the Engineering Change Control Manager 35 determines that the lowest status at which item I1 exists across all manufacturing locations is ACCEPT, and accordingly changes the status of the corresponding affected item AIOID1 to ACCEPT. After the status of an affected item is changed, a check is made to determine if the EC status must also be changed. The lowest status for any of the affected items in EC1 is RELEASE for affected items AIOID2, AIOID3 and AIOID4. This status is compared with the current EC status, and since they are the same, the EC status is left unchanged.

The above sequence at location MFG1 is repeated for the remaining affected items of EC1, i.e., AIOID2, AIOID3 and AIOID4. This results in the creation of location affected items LAIOID2, LAIOID3 and LAIOID4 in ACCEPT status at location MFG1, and in the revision to a status of ACCEPT for corresponding affected items AIOID2, AIOID3 and AIOID4. Following each update to the status of an affected item, the logic of FIG. 7 is executed to determine if the status of EC1 requires changing. After the status of AIOID4 is updated to ACCEPT, the status of EC1 is changed to ACCEPT.

At this stage, the acceptance process of EC1 has been completed at location MFG1. The manufacturing engineer can now decide to promote location affected item LAIOID1 to EFFECTIVE. The Engineering Change Control Manager promotes LAIOID1 to EFFECTIVE and changes the status of LAIOID1 to EFFECTIVE in LAI table 16. It then checks all other locations to determine the lowest status of the location affected item. The lowest status is EFFECTIVE since no other location has as yet accepted it. Therefore, the status of the corresponding affected item AIOID1 is changed to EFFECTIVE. Since there are other location affected items at location MFG1 that are in a status lower than EFFECTIVE, the status of EC1 will not be changed as a result of executing the logic of FIG. 7.

After determining that the design of LAIOID1 does not require further changes, the manufacturing engineer decides to promote LAIOID1 to CLOSED status. Engineering Change Control Manager 35 changes the status of LAIOID1 to CLOSED, goes through the global update logic again, and changes the status of AIOID1 to CLOSED. However, since AIOID2, AIOID3 and AIOID4 are still in ACCEPT status, the status of EC1 remains at ACCEPT.

Next, it is assumed that the manufacturing engineer at location MFG2 decides to accept affected item AIOID1 only, and not the other affected items of EC1. The Engineering Change Control Manager 35 verifies that location MFG2 has usage for item I1 (i.e., affected item AIOID1). Location affected item LAIOID1 (reference numeral 162) is then created at location MFG2 for affected item AIOID1, and the status of LAIOID1 is set to ACCEPT.

Since the status of a location affected item has changed, the logic of FIG. 6 is executed to determine if the global status AIOID1 needs to be changed. It finds that the status of LAIOID1 at location MFG1 is CLOSED and at location MFG2 is ACCEPT. Since ACCEPT is the lower status, the status of the corresponding affected item AIOID1 is changed from CLOSED to ACCEPT.

The process continues as above until all affected items of EC1 have been accepted and made effective at location MFG1 and MFG2. When the last location affected item gets promoted to EFFECTIVE, the global status of the final affected item (e.g., AIOID4) is changed to EFFECTIVE by executing the logic of FIG. 6 one final time. With all affected items of EC1 having a status of EFFECTIVE, the status of EC1 is also promoted to EFFECTIVE. The identical procedure is then executed for promoting the engineering change to CLOSED status.

While the invention has been particularly shown and described with reference to the particular embodiment thereof, it will be understood by those skilled in the art that various changes in form and details may be made therein without departing from the spirit and scope of the invention.

Having thus described our invention, what we claim and desire to secure as Letters Patent is as follows:

1. A method for controlling the management of engineering changes to a manufactured product using a central processing facility, said method comprising:
   identifying each item in the product that is affected by the engineering change;
   releasing the engineering change and a revised design for each item affected by the engineering change to a manufacturing location;
   at the manufacturing location, examining the released engineering change and, if necessary, modifying the revised design for an affected item based on production constraints at the manufacturing location; and
   tracking the status of the engineering change and each item affected by the engineering change at the central processing facility until said engineering change is completely implemented at said manufacturing location.

2. The method of claim 1 wherein the step of tracking the status of the engineering change and each item affected by the engineering change includes having an engineering change control application automatically update corresponding status entries in an engineering changes table, an affected items table, and a location affected items table to reflect each change in status.

3. The method of claim 2 wherein said engineering changes table, said affected items table, and said location affected items table are stored in a central database system and constitute part of a computer integrated manufacturing data repository.

4. A method for controlling and monitoring engineering and manufacturing changes in an enterprise wherein engineering changes are processed at a design location and manufacturing changes are processed at a manufacturing location, said method comprising:
   generating an engineering change wherein a plurality of items that are modified by said engineering change are identified as affected items, and placing said engineering change and each of said plurality of affected items in a status of pre-release;
   promoting said engineering change and each affected item to release status upon completion of design changes to all of said affected items;
   accepting each affected item at a manufacturing location, and creating, in a status of accept, a corresponding location affected item that represents the manufacturing location's view of each affected item;
   promoting each location affected item to effective status after manufacturing related data are appended to said location affected item; and
   monitoring the status of the engineering change, each corresponding affected item, and each corresponding location affected item until said engineering change is completely implemented at each manufacturing location to which it has been released.

5. The method of claim 4 including the step of implementing a central database repository having at least an engineering changes table, an affected items table, and a location affected items table, and automatically recording changes in status of the entries in said engineering change table, said affected items table, and said location affected items table.

6. The method of claim 5 wherein the step of promoting each location affected item to effective status includes:
   changing the status of each location affected item in the central database repository that is associated with the engineering change at the location to effective status;
   determining if the status of the corresponding affected item or the status of the associated engineering change needs to be updated.

7. The method of claim 5 wherein the step of promoting an engineering change and each affected item to release status includes:
   changing the status of each affected item in the database that is associated with the engineering change to release status;
   searching the central database repository to identify each manufacturing location that uses each affected item associated with the engineering change;
   sending a message to each manufacturing location identified to notify each identified location of the release of the affected items associated with the engineering change; and
   changing the status of the engineering change in the central database repository to release.

8. The method of claim 5 wherein the step of accepting each affected item at a manufacturing location includes:
   checking the status of the engineering change to verify that the engineering change can be accepted at the manufacturing location;
   searching the central database repository for each affected item associated with the engineering change to determine if the affected items are used at the manufacturing location; and
   determining if the status of each affected item and if the status of the associated engineering change needs to be updated.

9. The method of claim 8 wherein the step of determining if the status of each affected item needs to be updated includes checking the status of each corresponding location affected item at each identified location and setting the status of each affected item to the lowest status of each corresponding location affected item found during said check.

10. The method of claim 8 wherein the step of determining if the status of the engineering change needs to be updated includes checking the status of each affected item associated with the engineering change following an update to any of its associated affected items, and setting the status of the engineering change to the lowest status found during said check.

11. The method of claim 4 wherein the progression of status changes for each location affected item associated with the engineering change is, in ascending sequence from lowest to highest status, accept, effective and closed.

12. The method of claim 4 wherein the progression of status changes for the engineering change and its associated affected items is, in ascending sequence from lowest to highest status, PRE-RELEASE, RELEASE, ACCEPT, EFFECTIVE and CLOSED.

13. The method of claim 4 including the step of reviewing the engineering change and the design of the corresponding plurality of affected items at a manufacturing location, and generating a manufacturing change if a further change to an affected item is required based upon local manufacturing constraints.

14. A system for automatically controlling the management of engineering changes to a product manufactured by an enterprise having at least one data processor and at least one direct access storage device at a central processing facility, a first plurality of workstations located at a design center, and a second plurality of workstations located at a manufacturing location, said first and second pluralities of workstations connected electrically to said data processor, said system comprising:

interface means operating on the data processor and cooperative with each of said first and second pluralities of workstations for initiating changes in the status of an engineering change and each affected item and each corresponding location affected item that are associated with said engineering change;

a data repository stored on the direct access storage device including at least an engineering change objects table, an affected items table and a location affected items table with said engineering change objects table, affected item table and location affected item table being used to track and update the status of an engineering change and each associated affected item and corresponding location affected item; and logic means cooperative with said interface means and said data repository for automatically tracking and updating the status of the engineering change and each associated affected item and corresponding location affected item in response to changes in status initiated at said first and second pluralities of workstations.

* * * * *